United States Patent [19]

Pavone et al.

[11] Patent Number: 5,663,929

[45] Date of Patent: Sep. 2, 1997

[54] DRILLING SIGNAL TRANSMISSION METHOD AND SYSTEM

[75] Inventors: Didier Pavone, Eaubonne; Jacques Froment, Bussy Saint Georges; Eddy Thesee, Creteil, all of France

[73] Assignee: Institut Francais Du Petrole, Rueil Malmaison, France

[21] Appl. No.: 449,365

[22] Filed: May 24, 1995

[30] Foreign Application Priority Data

May 24, 1994 [FR] France ................... 94 06247

[51] Int. Cl.$^6$ .......................................... G01V 1/40
[52] U.S. Cl. ................................. 367/82; 364/422
[58] Field of Search .................. 367/25, 82; 364/422; 324/356, 369

[56] References Cited

U.S. PATENT DOCUMENTS

| | | | |
|---|---|---|---|
| 4,599,567 | 7/1986 | Goupillaud et al. | 324/77 |
| 4,695,957 | 9/1987 | Peltier | 364/422 |
| 4,974,187 | 11/1990 | Lawton | 364/728.01 |
| 5,151,882 | 9/1992 | Kingman | 367/82 |
| 5,455,874 | 10/1995 | Ormsby et al. | 364/422 |
| 5,513,528 | 5/1996 | Holenka et al. | 181/105 |

FOREIGN PATENT DOCUMENTS

| | | |
|---|---|---|
| 2720439 | 1/1995 | France . |
| 2713700 | 6/1995 | France . |

OTHER PUBLICATIONS

Ris et al; May 9, 1995, Int. Conf. Acoustics, Speech & Signal Proc., vol. 3662, pp. 389–392; abst. only herewith.

Ademrovic et al, Nov. 3, 1994, Proc. 16th Ann. Intern. Conf. IEEE in Med. & Bio., vol. 1, pp. A20–A21; abst. only herewith.

Yue et al, Opt.Eng., vol. 34, #1, pp 1/269–282, Jan. 1995; abst. only herewith.

"Lapped Transforms for Efficient Transform/Subband Coding", H.S. Malvar, *IEEE Transactions On Acoustics, Speech, And Signal Processing*, vol. 38(6), Jun. 1990, pp. 969–978.

"Wave propagation and sampling theory—Part II: Sampling theory and complex waves", J. Morlet et al., *Geophysics*, vol. 47(2), Feb. 1982, pp. 222–236, 15 Figs.

*Primary Examiner*—Nelson Moskowitz
*Attorney, Agent, or Firm*—Millen, White, Zelano & Branigan, P.C.

[57] ABSTRACT

The present invention relates to a method and to a system for transmitting a signal associated with drilling conditions and/or the behavior of a drill string element. The present invention comprises stages of segmentation of the signal, and of decomposition of each segment into a wavelet so as to obtain the wavelet coefficients. The method also comprises the stage of transmission of certain characteristic coefficients. The present invention also relates to a system suited for implementing the method.

12 Claims, 4 Drawing Sheets

DRILLING SIGNAL TRANSMISSION METHOD AND SYSTEM

BACKGROUND OF THE INVENTION

The present invention relates to a method for transmitting signals, notably vibrational signals, generated by the rotation of a drill bit.

In the drilling technique, be it intended for oilfield development or for other purposes, a drill bit screwed on to tubes whose assembly is commonly called drill string is used. The drill string is the mechanical link between the bottom of the hole drilled and the ground surface. The drill rig is the surface installation which notably drives the drill bit into rotation, assembles and bears the weight of the drill string, injects a fluid into the drill string. In a variant, the bit can be driven into rotation by a downhole motor assembled in the drill string. A compression stress called weight on bit (WOB) has to be applied on the bit so that the bit can destroy the rock. To that effect, drill collars are assembled above the bit. Drillpipes complete the drill string.

The drill man who drives the drill rig knows some parameters which condition the action of the drill bit: the weight hanging on the pipe hook, the rotary speed and the torque applied by the rotary table, the flow rate and the pressure of the fluid injected. These parameters, measured at the surface, are used for running the drilling operation without knowing the real working conditions of the bit at the bottom of the well.

Downhole devices for performing recordings and transmissions of measurements provided by downhole sensors have been developed. These devices, commonly called MWD (Measurement While Drilling), are mainly intended for transmitting towards the ground surface the geographic position of the drill bit. However, they can also include load sensors that measure the stresses in the drill collars located above the bit.

Document EP-A-0,558,379 also describes a measurement system located in the drill string, close to the bit, the system being connected to the surface by at least one electric conductor.

There are thus well-known means allowing acquisition of data relative to the dynamic behaviour of the drill string during the drilling operation.

However, these transmission means are complex if the necessary information rate is high.

It is therefore very interesting to be able to process the signals so that only the pertinent information has to be transmitted.

In order to run the drilling in an optimized manner, having signals representative of the behaviours of the drill bit is not sufficient, these signals also have to be interpreted in order to know the drilling process. In fact, the vibrational signals generated by the drill bit are complex signals which can provide a good representation of the evolution of the drilling operation, an operation which is not linear but which is a succession of different phases and behaviours.

A first problem encountered in the presence of such signals is the detection of one behaviour among the others. When these behaviours have been detected, the characterization of each behaviour can then be contemplated. Once characterization is completed, it will allow given behaviours to be recognized and predicted, and only characteristic coefficients to be processed or transmitted.

In certain signal instances, one may merely segment the signal into segments of a duration determined a priori, then each segment can be characterized according to the method of the invention. Once characterization is completed, analyses, processings or transmissions of the characterization coefficients can be performed. Furthermore, the means used can allow the original signal to be reconstructed from the characterization coefficients.

Optimization can consist in interpreting the vibration ranges of the drill string, notably at the level of the drill collars, in order to detect certain dysfunctionings of the drill bit. Certain dysfunctionings are well-known, such as stick-slip, where the rotation of the bit is very irregular until the bit jams, bit bouncing where the bit comes off the working face, or whirling where the bit moves in an uncoordinated precession motion. Analysis of the vibrations due to the reaction of the bit on the rock can also allow the changes of nature of the rocks to be detected, and maybe even the specific nature of a rock, the wear of the bit edges or the balling up of the bit (bad cleaning of the edges) to be identified.

To that effect, a method of analysis of the signals representative of the vibration ranges generated by the running of the bit is necessary.

One of the methods used is based on the use of the Fourier transform. The signal is decomposed into an infinite amount of sinusoids. However, when non stationary phenomena such as the behaviours of a bit during drilling are to be studied, the Fourier transform is inadequate. In fact, it appears that the most pertinent information is to be found in the non stationary parts of the signal.

SUMMARY OF THE INVENTION

The present invention describes a transmission method notably for analyzing and for processing drilling signals. Drilling signals are understood to be signals provided by sensors located in the drill string. Preferably, these sensors will be placed close to the drill bit in order to avoid at best damping and noise. However, in some cases, certain sensors can be placed close to the ground surface, which facilitates signal transmission.

The present invention thus relates to a method for transmitting at least one signal associated with drilling conditions and/or the behaviour of an element of a drill string comprising a drill bit driven into rotation, said signal being provided by at least one sensor located in said drill string. Said method comprises the stages as follows:

temporal segmentation of said signal by segmentation means, decomposition into Time-Scale or Time-Frequency wavelets by calculation means providing wavelet coefficients of each segment, transmission of at least part of said coefficients.

The Time-Scale wavelets can be Morlet wavelets, orthogonal, biorthogonal or dyadic.

The Time-Frequency wavelets can be Malvar wavelets.

Characteristic coefficients of each segment can be selected.

The characteristic coefficients can be the local maxima of said wavelet coefficients.

The characteristic coefficients can be the most energetic coefficients of each segment.

A stage of quantification of the coefficients to be transmitted can be performed.

The original signal can be reconstructed at least partly from said coefficients.

The segmentation, calculation and transmission means can be located in the vicinity of the sensor and transmission can be achieved between said means and the ground surface.

A binary coding of said coefficients can be performed and transmission can be achieved through pulsations in a fluid or by electromagnetic wave.

The invention further relates to a system for transmitting at least one signal associated with drilling conditions and/or the behaviour of an element of a drill string comprising a drill bit driven into rotation, said signal being provided by at least one sensor located in said drill string. The system comprises:

means of segmentation of said signal, calculation means providing wavelet coefficients of each segment by decomposition into Time-Scale or Time-Frequency wavelets, means for transmitting at least part of said coefficients The system can include means for the binary coding of said coefficients, said segmentation, calculation, transmission and coding means being in the vicinity of the sensor.

It should be noted that, for implementing the invention, the segmentation of the initial signal can be a mere temporal splitting of a determined length of time, for example 30-second segments. Of course, the reconstructed signal will not be optimal as regards information preservation, but in many cases an imperfect reconstruction will be sufficient.

However, if one wishes to improve signal processing, this stage can comprise splitting the signal into homogeneous segments.

What is understood to be a homogeneous segment is a sequence of a determined length of time having common characteristics or characteristics representative of the same event or behaviour.

In another stage, segments, homogeneous or not, can be characterized by calculating the coefficients related to the signal segment and the coefficients representative of the information contained in said segment are selected.

These representative coefficients can be transferred between the signal acquisition and characterization zone and a signal analysis zone, the latter zone being far away from the first one.

The behaviour represented by the signal can be classified and identified by analyzing the characteristics of the segmented signal by comparison with a data base or according to classification criteria determined according to the conditions.

The present invention is notably based on the application, to a drilling signal, of the wavelet transform referred to as "Morlet wavelets" and of the Local Cosine Transform or "Malvar wavelets". However, other wavelet types are suited to the present application.

The documents cited in the annex attached to the description, in which the wavelet theory used in the present invention is described, can be consulted.

BRIEF DESCRIPTION OF THE DRAWINGS

Other features and advantages of the invention will be clear from reading the description hereafter given by way of non limitative examples, with reference to the accompanying drawings in which.

DESCRIPTION OF THE PREFERRED EMBODIMENTS

Figure 1A:
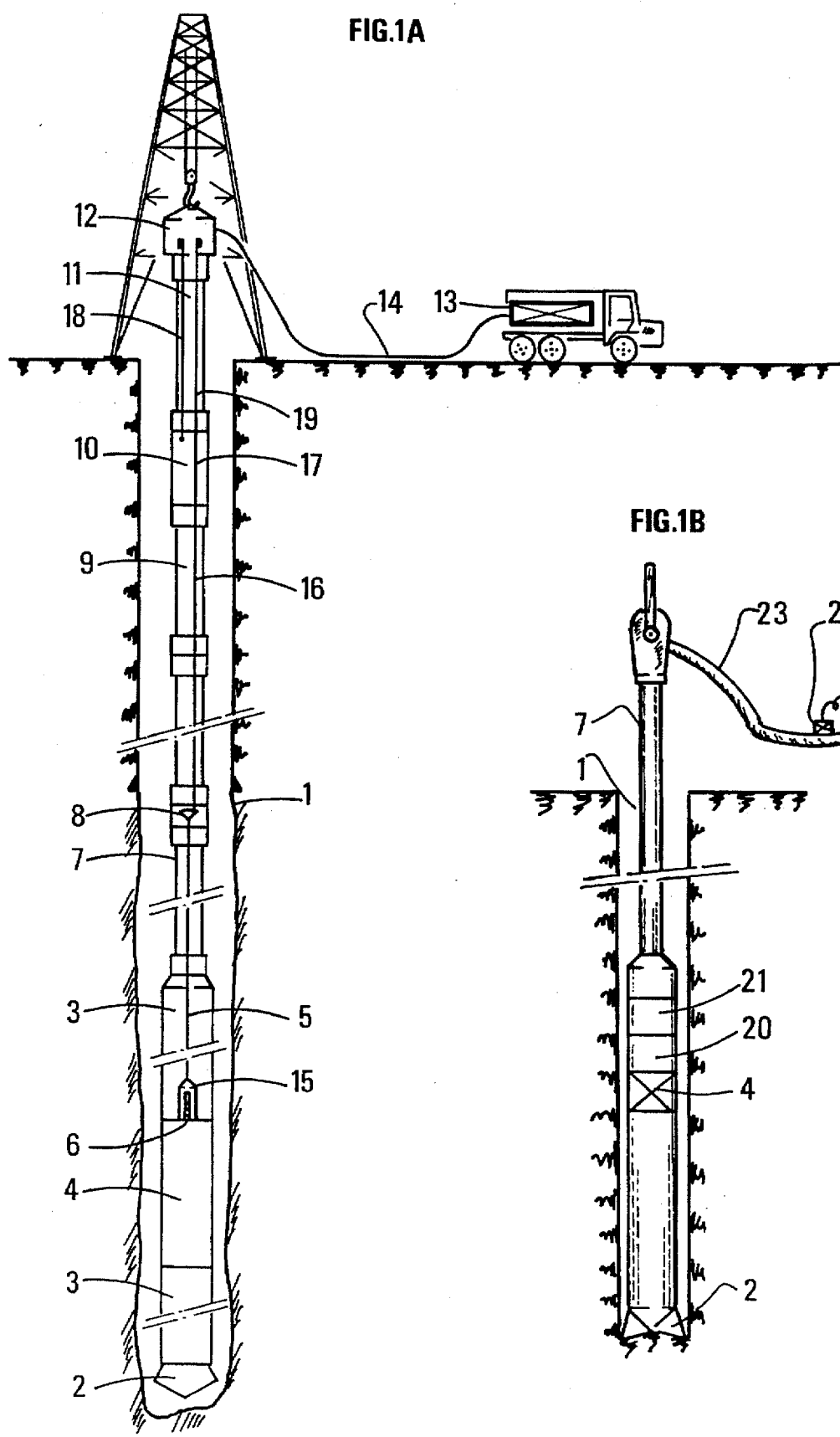
FIGS. 1A and 1B show means of acquisition of a drilling signal.

FIG. 1A shows means of acquisition and of transmission of drilling signals. This means is described in document EP-0,558,379.

Reference number 2 refers to the drill bit lowered by means of the string in well 1. Conventional drill collars 3 are screwed above the bit. The first measuring means consists of a sub 4 generally placed above bit 2 where measurements next to the bit are of greater interest, notably for following the bit dynamics. It can however be located inside or at the top of the drill collars, or even at the level of the drillpipes.

The drill string is completed by conventional pipes 7 up to the suspension and connection sub 8. Above this sub, the drill string is lengthened by adding cabled pipes 9.

The cabled pipes 9 will not be described in this document since they are known in the prior art, notably through patents FR-2,530,876, U.S. Pat. No. 4,806,115 or application FR-2, 656,747.

A second measuring means located in a sub 10 is screwed below kelly 11, the cabled pipes being then added below this sub 10. A rotary electric connection 12 located above kelly 11 is electrically connected to the surface installation 13 by a cable 14.

When the drill rig is fitted with a power swivel, there is no kelly and the measuring sub 10 is screwed directly below rotary connection 12, which is located below the power swivel.

The measuring sub 4 includes a male connector 6 whose contacts are linked to the measuring sensors and to the associated electronics included in sub 4.

A cable 5 equivalent to a wireline logging cable comprises, at its lower end, a female connector 15 adapted for co-operating with connector 6. The other, upper end of cable 5 is suspended from sub 8. Sub 8 is adapted for suspending the cable length 5 and for connecting electrically the conductor or conductors of cable 5 to the electric link or links of the cabled pipe located immediately above. The electric link provided by the cabled pipes bears reference number 16. This electric link passes through 17 in the second measuring sub 10.

When a kelly 11 is used, it is also cabled and includes two electric cables 18 and 19. One cable, 18, connects the second sub 10 to the rotary contacts of rotary connection 12, and the other, 19, connects line 17 to other rotary contacts of connection 12.

The rotary electric connection 12 can comprise 12 tracks. It is designed to meet the antiblast standards required in the neighbourhood of a drill floor.

The surface cable 14 can include at least six conductors.

Sub 4 is generally connected by a single-conductor to the surface installation 13. The measurements and the power supply pass through the same line.

The measuring means of sub 4 preferably comprises sensors for measuring, alone or in combination:

the weight on bit, the reactive torque about the drill bit, the bending moments along two orthogonal planes, the accelerations along three orthogonal axes, one of them merging in the longitudinal axis of the drill string, the temperature and the pressure inside and outside the string, the rotation acceleration, the components of the magnetic field.

The first three measurements can be obtained through strain gages stuck onto a test cylinder. They are protected from the pressure by an appropriate housing. The design and the build-up of this housing are adapted for preventing measuring errors due to efficiency.

Accelerations are measured by two accelerometers per axis in order to control errors induced by the rotation dynamics.

The last set of measurements is obtained by specific sensors mounted in a separate part of the sub.

The second measuring means of measuring sub 10 preferably includes, alone or in combination, sensors for measuring:

the tension, the torsion, the axial acceleration, the internal pressure or pump pressure, the rotation acceleration.

The design of this surface sub 10 is not basically different from that of the first sub, apart from the obligation to leave a free mud passage substantially coaxial to the inner space of the string so as to allow, if need be, transfer of a bit inside the string.

In a variant of the acquisition system, a high frequency of measurement transmission is obtained by electric links consisting of cable 5, line 16 and 17, and surface cable 14. Certain downhole sensors which require no high frequency sampling can transmit their measurements through other channels, by pressure wave or electromagnetic wave for example.

Sub 4 can include the necessary electronics to compact the information provided by at least one drilling signal. The characteristic coefficients of signal segments can then be transmitted either through the electric conductor of the device of FIG. 1, or by pressure wave or electromagnetic wave, or by any other suitable transmission means.

Sub 4 can also comprise the electronic means of automatic segmentation into homogeneous segments, and means for selecting the characteristic segments of a behaviour of the determined drilling, a behaviour which will be brought to the operator's attention after transmission of the characteristic coefficients to the surface.

Figure 1B:
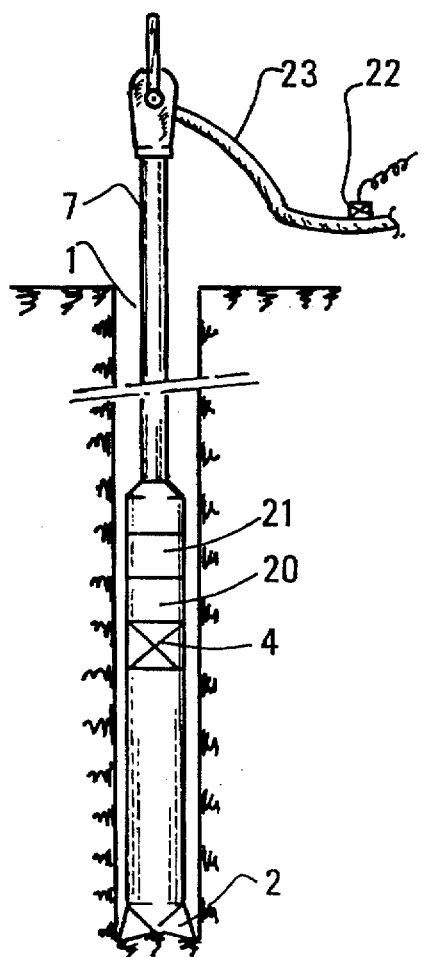

FIG. 1B shows a conventional drill rig in which one has inserted in the drill collars a measuring sub 4 which records at least one drilling signal, an electronic installation 20 including the signal compaction means, an installation 21 for coding and transmitting to the surface the characteristic coefficients of the signal. Transmission can be achieved by pressure waves in the column of fluid inside the drill string. A pressure detector 22 located on the surface injection line 23 transmits the pressure waves to a surface processing installation which decodes the pressure waves to obtain the characteristic coefficients. The surface installation can identify the behaviour according to a data base or to particular instructions, or reconstruct the signal in order to give the operator for example analog measurements.

Figure 2:
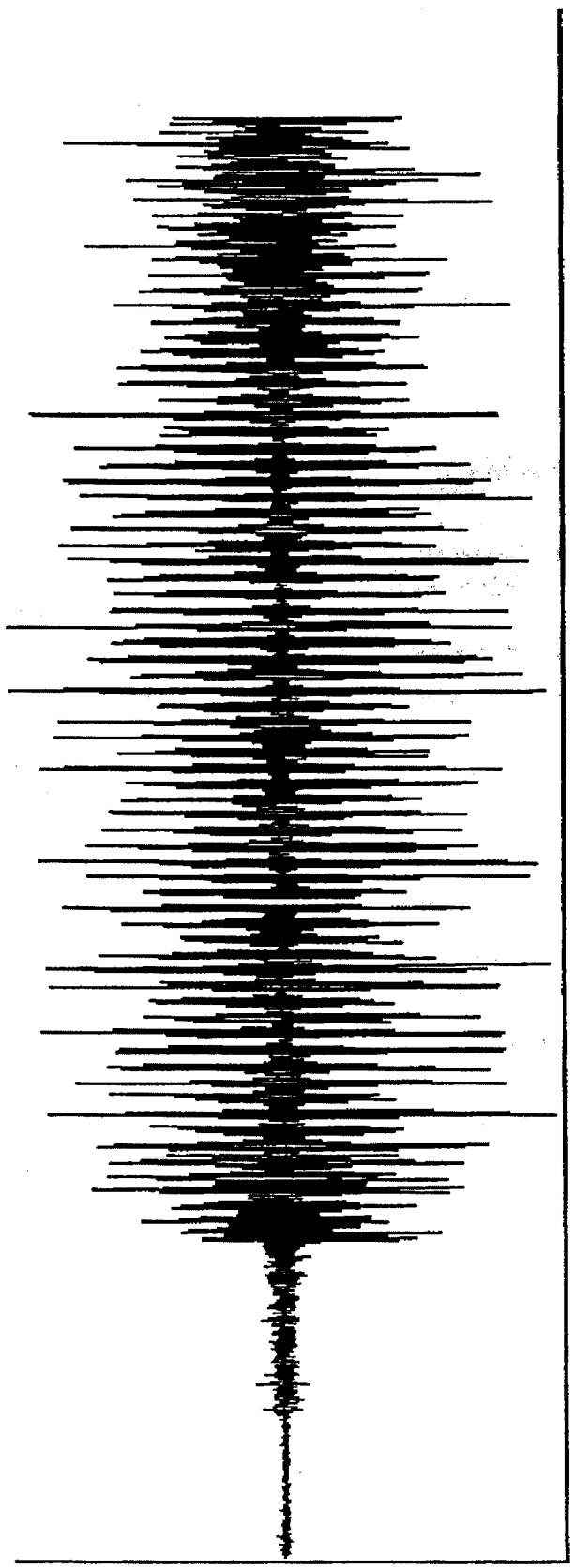
FIG. 2 shows an example of a drilling signal.

FIG. 2 shows an example of a drilling signal as a function of time t.

Figure 3A:
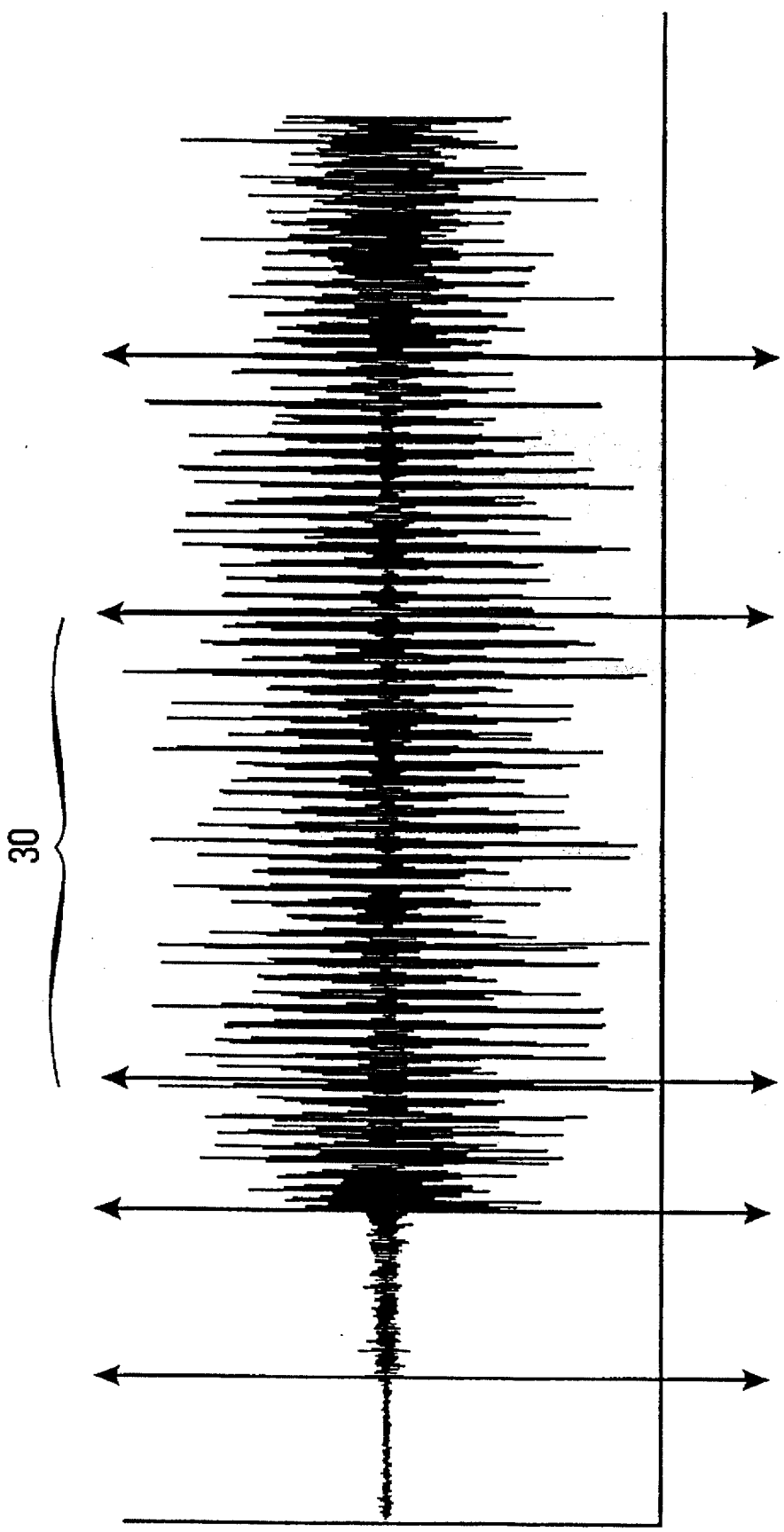
FIGS. 3A and 3B show the segmentation of the drilling signal and the materialization of the characteristic coefficients of each segment.

FIG. 3A shows the signal segmentation obtained for example by processing through the wavelets.

Figure 3B:
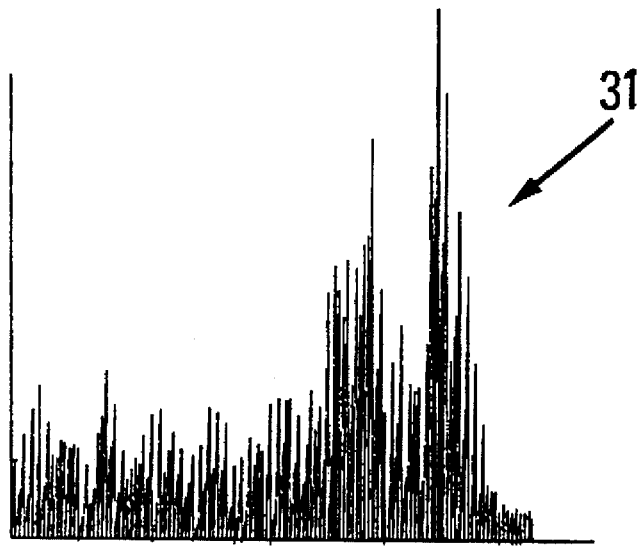

Segment 30 has been decomposed by wavelet according to the invention. The wavelet coefficients are shown in FIG. 3B by vertical lines 31.

Figure 4:
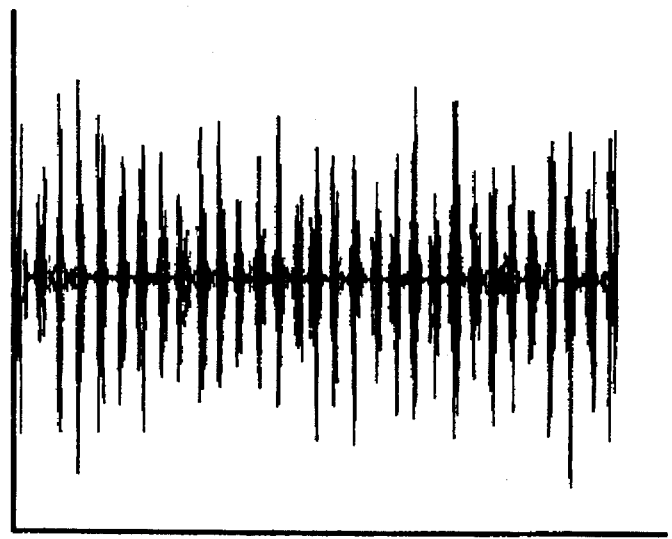
FIG. 4 shows a part of the reconstructed signal.

FIG. 4 illustrates the reconstruction of segment 30 from certain coefficients materialized by lines 31.

ANNEX

The present invention is based on the application, to a drilling signal, of a time-scale wavelet transform and of a time-frequency wavelet transform.

The following documents provide additional information and further details about the concepts handled:

(1) R. Coifman, V. Wickerhauser, "Entropy-based Algorithms for Best Basis Selection", IEEE Transactions on Information Theory. Vol. 38, No. 2, March 1992.

(2) M. Holschneider, R. Kronland-Martinet, J. Morlet, Ph. Tchamitchian, "A Real Time Algorithm for Signal Analysis with the Help of Wavelet Transform", in Wavelets, Time-Frequency Methods and Phase Space, J. M. Combes, A. Grossmann and Ph. Tchamitchian, Eds. Berlin: Springer, ITPI 1989, pp. 286–297.

(3) H. Malvar, "Lapped Transforms for Efficient Transform/Subband Coding", IEEE Transactions on Acoustics, Speech and Signal Processing, 38:969–978, 1990.

(4) J. Morlet, A. Grossmann, "Reading and Understanding Continuous Wavelet Transform".

(5) K. R. Rao, P. Yip, "Discrete Cosinus Transform", Academic Press, New York, 1990.

The use of the wavelet techniques can be considered as an alternative in relation to the methods based on the Fourier transform. In fact, these methods reach their limits when non stationary phenomena (beginning or end of events, ruptures, modulations, . . . ) are studied. A distinctive feature of the Fourier transform is that it delocalizes the information along the time variable, which may be very unfavourable for the study of a non stationary signal. In fact, the pertinent information is mainly to be found in the non stationay parts. These parts are generally limited in time, but they have a wide frequency spectrum. The wavelets will therefore allow a more localized study of the signal to be performed, with a time variable as well as with a Fourier variable.

A wavelet transform consists of the decomposition of a signal on functions which vibrate like sinusoids within a certain time range and which decay very strongly outside this range. Such an analysis is constructed from a function $\psi(x)$ called mother wavelet or analyzing wavelet, meeting the definition as follows:

Definition No. 1: A function $\psi$ of value in R or in C is a wavelet if it has a compact support (or if it is of fast decay to infinity) and if it meets the essential condition as follows:

$$\int_{-\infty}^{+\infty} \psi(x)dx = 0. \tag{1}$$

In the transform calculation, there is no multiplication by sines or cosines (as in the methods derived from the Fourier transform). A family of wavelets is generated by translation and by dilatation from the mother wavelet:

$$\psi_{a,b}(x) = a^{-1/2} \psi\left(\frac{t-b}{a}\right) \quad a>0, -\infty<b<+\infty$$

These wavelets are the base elements which will be used for the analysis construction. Parameter a gives the average width of the wavelet and parameter b its position. The wavelet coefficients of a function f(x) of the real variable x, or of a signal s(t) (t being a time variable) are the scalar products defined by the formula:

$$W_f(a,b) = <f, \psi_{a,b}> = \int_R f(x)\overline{\psi_{a,b}(x)}dx \quad a>0, -\infty<b<+\infty. \tag{2}$$

The following remark can be made here:

Let $$\psi_a(x) = \frac{1}{\sqrt{a}} \psi\left(\frac{x}{a}\right) \quad \text{(dilatation without translation)}$$

and $$\tilde{\psi}_a(x) = \psi_a(-x)$$

then $$f*\tilde{\psi}_a(b) = \int_R f(x)\tilde{\psi}_a(b-x)dx = W_f(a,b).$$

A wavelet transform thus consists of a filtering of f by band-pass filters of impulse response $\tilde{\psi}a$.
Let $$K\psi = \int_R \frac{|\hat{\psi}(\omega)|^2}{\omega} d\omega.$$

In the case where $K\psi<+\infty$, the signal can be reconstructed from its decomposition by applying the formula as follows:

$$f(x) = \frac{1}{K_\psi} \int_{R^2} W_f(a,b)\psi_{a,b}(x) \frac{dadb}{a^2}. \quad (3)$$

$K\psi$ plays the part of a normalizing coefficient.

The wavelet analysis thus provides a tool for measuring the local fluctuations of a function f about a point b, at a scale a, as well as a method of reconstruction from these fluctuation coefficients.

The wavelet transform, by definition, is rather a time-scale representation than a time-frequency representation. However, since it can be identified with a band-pass filtering, the wavelet transform can generally admit a time-frequency interpretation by considering that the variation of the scale parameter a allows the frequency axis to be explored. This is notably the case for wavelets "reasonably" localized in frequency about a value $v_0$. It is then possible to perform a time-frequency interpretation by means of the formal identification $v=v_0/a$.

0.1 Use

The formula of the continuous version of the wavelet transform given by Equation (2) cannot be used directly to achieve an implementation. Analysis of a signal is generally performed with a number of scales ranging between 8 and 12 octaves. The process thus requires the use of a fast algorithm in order to reduce the complexity of the operations and to allow calculations to be envisaged. Such algorithms are achieved from discrete version of the wavelet transform. However, there are differents ways to consider this discretization, which mainly depend on the way the time and scale variables are processed.

The "gapped algorithm" described in this document uses for example the discrete version:

$$S(n,m) = \delta a_o^{-\frac{m}{2}} \sum_k s(k\delta)\bar{g}(a_o^{-m}(k-n)\delta) \quad (4)$$

$\delta$ being the inverse of the sampling frequency of the signal. This algorithm, by reducing the complexity of the convolutions (measured by the size of the filter used for convolving) by means of factorizations, allows the discretization (4) to be efficiently used.

By studying the plane paving structure associated with the wavelet transform, one observes that the latter is all the more narrow in time since the evaluation point is at a higher frequency, and the use of a non-uniform grid:

$$\{(t,a)=(nt_oa_o^m,a_o^m);t_o>0,a_o>0;n,m\in Z\}$$

allows the discrete wavelet transform to be defined by:

$$D_s[n,m] = a_o^{m/2} \int_{-\infty}^{+\infty} f(s)\overline{\psi}(a_o^m s - n\delta t)ds; \; n,m\in Z.$$

The choice $a_o=2$ corresponds to a dyadic scale decomposition (one coefficient series per octave).

To sum up, the analysis of a signal will be performed according to the following pattern:

acquisition of the drilling signal, application of the decomposition algorithm, fixing the percentage of the highest coefficients to be taken into account during reconstruction, finding the original signal again with the inverse transform formula from the coefficients selected.

0.2 Gapped algorithm

One of the algorithms implementing a continuous transform is briefly described hereunder. This algorithm, referred to as "gapped algorithm", is based on the principle as follows: in the coefficient calculation, the analyzing wavelet g is replaced by another wavelet constructed from the previous one by interpolation (by means of filtering) between points forming the initial sampling of g. This method can be carried out in practice only with a simplification of the convolution products to be calculated.

Let D and I be the dilatation and inversion operators. The wavelet transform of a signal s with respect to a wavelet g(t) can be written in the form of the convolution product as follows:

$$S_a=S(.,a)=Kg_as \text{ with } g_a=D_aIg \quad (5).$$

Consider the sampling operator P which associates with the sequence s(t) t∈R the sequence s(n) n∈Z. It is then possible to write, from equation (5):

$$S_a=Kg_as \text{ with this time } g_a=PD_aIg \quad (6).$$

The calculation iterations are such that a sampling of the dilated original wavelet must be available. In order to reduce the complexity of the convolutions with the dilated wavelets, they are factorized in convolutions with smaller filters.

This operation is performed as follows:

Construction of an operator O such that $$\underbrace{O^n P g}_{\text{sequence}} = \underbrace{P(D_2)^n g}_{\text{function}}, \; n\in N. \quad (7)$$

sequence sequence

Take $O=D_2$, therefore $(D_2 g)(n)=0$ for any odd n.

An interpolation procedure will rather be performed (refer to the bibliography for further details) with the operator $O=D_2+TD_2K_F$, which gives non systematically zero values for the odd positions.

Simplification of the convolutions

The convolution by ($O^n.g$) is factorized in more simple convolutions $$K_g n_g = \alpha^n K_{g_a} K_{F_1} \ldots K_{F_n} \text{ with } \alpha = 2^{-\frac{1}{2}}$$

and $$g_n = (\alpha^{-1} D_2)^n g$$

$$F_{i+1} = (\alpha^{-1} D_2) F_i$$

From the previous result, the transform on N octaves is then calculated according to the pattern as follows:

$$S_{a=1} = K_g s \quad \text{(octave 0)}$$

$$F_1 = 1 + T(\alpha^{-1} D_2) F \quad X_1 = \alpha K_{F_1} s$$

$$g_1 = \alpha^{-1} D_2 g \quad S_{a=2} = K_{g_1} X_1 \quad \text{(octave 1)}$$

$$F_2 = \alpha^{-1} D_2 F_1 \quad X_2 = \alpha K_{F_2} X_1$$

$$g_1 = \alpha^{-1} D_2 g_1 \quad S_{a=2^2} = K_{g_2} X_2 \quad \text{(octave 2)}$$

$$\ldots \quad \ldots$$

$$F_N = \alpha^{-1} D_2 F_{N-1} \quad X_N = \alpha K_{FN} X_{N-1}$$

$$g_N = \alpha^{-1} D_2 g_{N-1} \quad S_{a=2^N} = K_{gN} X_N \quad \text{(octave } N\text{)}$$

Transform on Several Voices

In this case, a restriction of S(b,a) to a set of discrete values of the scale parameter a will be considered. Such a restriction $S(b,a_i)$ is called a voice. Two consecutive voices form a constant ratio $a_i/a_{i+1}$. The most common situation is that where $a_j = a_o 2^{j/nv} = 2^{no+k/nv}$, the integer nv defining the number of voices per octave, j the number of the voice in the analysis, no the number of the octave and k the number of the voice in the octave. These are thus intermediate values taken for passing from $a=2^j$ to $a=2^{j+1}$. A division in 12 voices per octave appears to be satisfactory to approach continuity on the scales axis (by analogy with the temperate distributions).

Since nv voices are to be considered in each octave, implementation is achieved by superposing nv versions of the algorithm corresponding to nv different wavelets (dilated versions of the original wavelet). In fact, the ratios between the values $a_i$ being constant, the ratio between the kth voice of the octave $O_i$ and the kth voice of the octave $O_j$ will be the same as the ratio between the nth voice of the octave $O_i$ and the nth voice of the octave $O_j$. The wavelet will therefore be calculated for the first nv dilatations (corresponding to the nv voices of the octave O), and the previous pattern will be applied with, at each time, a different original wavelet $g_v$ defined by:

$$g_v(t) = \frac{e^{i\omega_o t} e^{-\frac{t^2}{2}}}{\sqrt{2\frac{v-1}{nv} \times \delta}} \quad t \in [\text{Maxi}_v, \text{Mini}_v].$$

Let [Inf-Wave, Sup-Wave] be the base sampling of the wavelet, i.e. theinterval in which t varies when g(t) is calculated.

The sampling intervals [$\text{Maxi}_v$, $\text{Mini}_v$] will then be calculated as follows for the dilated versions:

a. Calculation of $\text{Maxi}_v$: $2^{v-1/nv} \times \text{Inf-Wave}$ b. Calculation of $\text{Mini}_v$: $2^{v-1/nv} \times \text{Inf-Wave}$ c. Definition of the wavelet calculation points:

Let $fe$ be the sampling frequency of the signal to be analyzed, put $Freq=fe/2$ (which is the maximum frequency analyzed). The wavelet will then be calculated at the points $t = ja\delta/fe$ with $a = 2^{v-1/nv}$, j being a point of the sampling interval (i.e. j varies from Mini to Maxi), and $\delta = 2\omega_o/\text{Freq}$.

By carrying out a wavelet transform, one passes from a one-dimensional signal s(t) to a two-dimensional signal S(n, m), i.e. a sequence of one-dimensional signals (a sequence of coefficients for each value of the dilatation parameter). Reading of these signals may prove very difficult if no appropriate representation mode is available.

In order to facilitate the interpretation of the results obtained, the coefficients will not be used directly as they are. One will choose, for example, to consider them as the pixels of an image indexed by the parameters n (time parameter) and m (scale parameter). The small scales, representing the high frequencies, are at the top of the image and the large scales, for the lower frequencies, are at the bottom of the image (article [4] gives further information concerning the interpretation of these images). The passage of a coefficient of the transform to a grey level occurs by projecting the interval [Coeff-Min, Coeff-Max] in [0.255]. The introduction of a saturation coefficient is sometimes necessary to be able to perfectly exploit the images obtained.

This image thus has as many columns as there are points in the initial signal, which facilitates interpretation. In fact, the image and the signal just have to be juxtaposed to get an idea of the behaviours involved.

For each signal, one gets an image representing the analyses at the various scales. Interpretation is much more simple since the whole information is directly available in the image. Furthermore, this image allows to get a first notion of the signal to be processed and to give a first assessment concerning its characterization.

1 Time-frequency wavelets

The time-scale analysis (also called multiresolution algorithm) is based on the use of a wide range of scales for analyzing the signal. Although it is interpretable as regards frequency, it does not offer a high precision in this domain.

To overcome this drawback, we present hereafter a second method of analysis leading directly to a segmentation algorithm and based on the use of time-frequency wavelets referred to as Malvar wavelets. The analysis through Malvar wavelets lies within the general framework of the window Fourier transform. The Malvar wavelets allow a local frequency analysis of the signal to be performed, while minimizing the artifacts which generally go with such algorithms.

1.1 Description of the algorithm

This method rests on the local cosine transform of a signal or "Malvar wavelets". It provides an invertible spectral representation enabling a perfect reconstruction, as well as a very efficient data compression tool.

Let $$R = \bigcup_{j \in Z} I_j$$

be a partition of the real line.

With $I_j = [a_j, a_{j+1}[$ an interval of length greater than or equal to $\epsilon(\epsilon > 0$ fixed).

Let $b_j$ be the window as follows:

$$b_j = \begin{cases} \beta\left(\frac{t-a_j}{r}\right) & t\in[a_j-r, a_j+r[ \\ 1 & t\in[a_j+r, a_{j+1}-r[ \\ \beta\left(\frac{a_{j+1}-t}{r}\right) & t\in[a_{j+1}-r, a_{j+1}+r[ \\ 0 & t\in]-\infty, a_j-r]\cup[a_{j+1}+r, +\infty[ \end{cases}$$

with $$\beta(t) = \sin\left(\left[\frac{\pi}{4}\left(1+\sin\left(\frac{\pi}{2}t\right)\right)\right]\right) \text{ and } r \leq \inf_{j\in Z}(a_{j+1}-a_j)$$

The family of functions as follows:

$$\psi_k^j = b_j(t)\frac{\sqrt{2}}{\sqrt{|I_j|}}\cos\left(\frac{\pi}{|I_j|}\left(k+\frac{1}{2}\right)(t-a_j)\right)$$

with $j \in Z$, $k \in N$ is then an orthonormal base of $L^2(R)$. This means that any signal $S(t) \in L^2(R)$ can be written:

(8)

$$S(t) = \sum_{\substack{j\in Z \\ k\in N}} c_k^j \psi_k^j(t)$$

with
$c_k^j = <s(t), \psi_k^j(t)>$
and $$\|S(t)\|^2 = \sum_{\substack{j\in Z \\ k\in N}} |c_k^j|^2$$

This decomposition offers a complete and non-redundant spectral representation. The sequence of coefficients $c_k^j = <S(t), \psi_k^j(t)>$ for $k\in N$ being the local spectrum of S on the interval $I_j$.

Several local transforms can be calculated at the same time by dividing the intervals by two recursively. The base functions for each interval are the direct sum of the bases of the two subintervals. The convolution product (8) can be calculated by using a fast cosine transform. This calculation is preceded by a stage called "folding stage".

Let $$f(t) = \begin{cases} \sin\left(\frac{\pi}{4}\left(1+\sin\left(\frac{\pi}{2}t\right)\right)\right) & \text{if } -1 < t < 1 \\ 0 & \text{if } t < -1 \\ 1 & \text{if } t > 1 \end{cases}$$

and $$f_j(t) = \begin{cases} f\left(\frac{t-a_j}{r}\right) & \text{if } a_j-r < t < a_j+r \\ 0 & \text{if } t < a_j-r \\ 1 & \text{if } t > a_{j+1} \end{cases}$$

The following operator:

$$U_j S(t) = \begin{cases} f_j(t)S(t) + F_j(2a_j-t)S(2a_j-t) & \text{if } a_j \leq t \\ f_j(2a_j-t)S(t) - f_j(t)S(2a_j-t) & \text{if } a_j > t \end{cases}$$

is called folding operator. Applying this operator to a signal S(t) amounts to associating therewith a set of signals $S_j(t) \in L^2(I_j)$, $j\in Z$ such that:

$$S_j(t) = \begin{cases} U_j S(t) & \text{if } t\in[a_j, a_j+r] \\ S(t) & \text{if } t\in[a_j+r, a_{j+1}-r] \\ U_{j+1} S(t) & \text{if } t\in[a_{j+1}-r, a_{j+1}] \end{cases}$$

Put $$\emptyset_k^j(t) = \frac{\sqrt{2}}{\sqrt{|I_j|}}\cos\left(\frac{\pi}{|I_j|}\left(k+\frac{1}{2}\right)(t-a_j)\right) 1_j(t)$$

(where $1_j(t)$ is the indicatrix of the interval $I_j$), the $\{\emptyset_k^j\}_{k\in N}$, called Malvar wavelets, being an orthonormal base of $L^2(I_j)$, then:

$$S_j(t) = \sum_{k\in Z} c_k^j \emptyset_k^j(t)$$

The coefficients $c_k^j = <S_j(t), \emptyset_k^j(t)>$ thus form a local spectrum in $I_j$.

Furthermore, this local spectrum in $I_j$ can be represented in the base of $\{\psi_k^j(t)\}_{k\in N}$, we have the quality as follows:

$c_k^j = \{S_j(t), \emptyset_k^j(t)\} = \{S(t), \psi_k^j(t)\}$.

Applying the cosine transform to the $S_j(t)$ therefore amounts to calculating all the convolution products with the function $\psi_k^j$.

The folding operation allows the edges to be taken into account while avoiding the overlap biases in the transform calculation, or the appearance in the analysis of discontinuities which would not be due to the signal but to the sudden breaks imposed by insufficiently soft windows. The unfolding operation which comes into play for the reconstruction can be defined reciprocally.

Let S(t) be a given signal, a folding is stared at the edges (S°(t) is thus obtained), then in a recursive manner at the center of the signal obtained (the signal is in a way folded up on itself).

At each level, a set of functions $\{S_j^1(t)\}$ is associated with S(t), knowing that: $\{S_j^1(t)\}\in L^2(I_j^1)$ gives at the next level:

$S_{2j}^{l+1}(t)\in L^2(I_{2j}^{l+1})$ and $S_{2j+1}^{l+1}(t)\in L^2(I_{2j+1}^{l+1})$, (1 being the level in the decomposition).

It is then possible to calculate the transform (through the conventional algorithm DCT-IV) for each $S_j^1$, which gives the corresponding local spectrums $d_j^1$.

The following result is important:

$$\|S\|^2 = \|S^0\|^2 = \|S^l\|^2 \stackrel{def}{=} \sum_k \|S_k^l\|^2 ; \|S_k^l\|^2 = \|d_k^l\|^2$$

which means energy conservation.

1.2 Adaptive segmentation

The Malvar algorithm performs no segmentation, it decomposes the signal in a window of a given size. It may be interesting to adapt the window to the local characteristics of the signal (wide windows for stationary zones and short ones for transitions) by using a window growth algorithm by merging.

This modification is performed by acting upon the values ($a_j$) which are used for defining the segments $I_j$. The elementary modification consists in merging two intervals $[a_{j-1},a_j]$ and $[a_j,a_{j+1}]$ while removing $a_j$, the others remaining unchanged.

The use of this merging procedure requires introduction of a decision criterion allowing the cost of the operation and therefore the interest to do it to be assessed.

Let $\{x_k\}$ be a sequence of $l^2$, the spectral entropy of $\{x_k\}$ is denoted by:

$$H(x) = -\sum_k \frac{|x_k|^2}{\|x\|^2} \log \frac{|x_k|^2}{\|x\|^2} = \frac{\lambda(x)}{\|x\|^2} + \log\|x\|^2$$

with $\lambda(x) = -\sum_k |x_k|^2 \log|x_k|^2$

Then, $$\exp(H(x)) = \|x\|^2 \exp\left(\frac{\lambda(x)}{\|x\|^2}\right)$$

is the theoretical dimension of the sequence $\{x_k\}$.

The entropy allows the number of significant terms in the decomposition to be measured. This value constitutes an interesting criterion for assessing the cost of a merging. Of course, this does not role out the use of other criteria which may lead to the same results.

The segmentation algorithm uses a procedure of "best base search" among a family of orthonormal bases of $L^2(R)$. These bases are obtained from an arbitrary segmentation of the time axis into dyadic intervals. These intervals are constructed in a "fine to coarse" dynamics. One starts from an arbitrary base (associated with a segmentation of the signal) comprising $2^l$ segments. The local spectrum is calculated in each interval. The dynamics consists in removing certain points used in the segmentation and in replacing two contiguous dyadic intervals $I_1$ and $I_2$ by the dyadic interval $I=I_1 \cup I_2$. And the operation is continued recursively.

For example, suppose that the finest (arbitrary) segmentation of the interval I is $I^1=[a_1^1,a_2^1]\cup \ldots \cup[a_{n-1}^1,a_n^1]$. The local spectrum will thus be calculated in the intervals $I_j^1=[a_j^1,a_{j+1}^1]$. The same will be done with $I^{l-1}=\cup_{j=1}[a_{2j-1}^1,a_{2j+1}^1]$ until $I^o=I$.

Once this operation is completed, the best base search algorithm can be applied.

⊕Search of the Adapted Local Spectrum by Entropy Minimization

What is available is:

a temporal partition at several levels m=0, 1, . . . ,maxl and $[0,2]^n=\cup_{0\leq j<2^l} I_j^1$ a local spectrum for each interval $I_j^1$ at the level 1:

$c_j^1 = \{c_{j,k}^1 : 0 \leq k < 2^{N-1}\}$

The recursive procedure of division of the intervals by two implies that $|I_j^1|=2\times|I_j^{l+1}|$.

The adapted local spectrum is obtained by means of the entropy minimization algorithm presented hereunder:

initializing with the local spectrum at the lowest level (maxl):

$a_j^o=c_j^o$ (Rq:m=0=>1=maxl)

calculating $a_j^m$ as follows:

$a_j^m=c_j^m$ if $H(c_j^m)<H(a_{2j}^{m-1})+H(a_{2j+1}^{m-1})$, or else $a_{2j}^{m-1} \cup a_{2j+1}^{m-1}$ for m=1, . . . ,maxl.

The division of the time interval corresponding to this adapted spectrum is called: adapted temporal partition.

1.3 Use

According to the invention, the signal S(t) is a "drilling signal", sampled within a time interval [0,T].

From the previous results, we know that each $S_j(t) \in L^2(I_j)$ can be decomposed on an orthonormal base of elementary waves:

$$S_j(t) = \sum_{0 \leq k < n_j} c_k^j \emptyset_k^j(t)$$

$n_j$ being the number of samples of the interval $I_j$ considered, and $c_k^j$ the coefficients obtained by DCT-IV. The algorithm (analysis and reconstruction) can be summarized as follows:

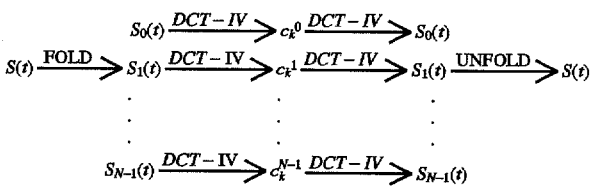

Each coefficient $c_k^j$ gives the amplitude of the elementary wave associated therewith. The period of this wave being:

$$T_k = \frac{2\pi}{\omega_k} \text{ with } \omega_k = \frac{\pi}{|I_j|}\left(k+\frac{1}{2}\right),$$

its frequency thus is:

$$F_k = \frac{\omega_k}{2\pi} = \frac{k+\frac{1}{2}}{2|I_j|}$$

The sampling frequency being $n_j/|I_j|$, we have $$0 \leq F_k < \frac{n_j+\frac{1}{2}}{2|I_j|}$$

For a signal sampled in a uniform manner in [0,T], each interval $I_j$ can theoretically contain the same maximum frequency.

In a given segment, the spectrum of the frequencies is then studied more precisely. The index of the most significant spectral component is determined first:

$$c_{ko} = \max_{0 \leq k < n} |c_k| \tag{9}$$

The frequency $F_{ko}$ associated with $k_o$ is called fundamental frequency.

When this value has been determined, all the coefficients located in its frequency neighbourhood (i.e. all the $c_k$ such that $|k_o-k|<\nu$) removed (by zeroing them). And the operation is reiterated.

The search for the fundamental frequencies associated with a given interval is thus performed as follows:

1. Seeking in the sequence $\{c_k\}$ the value $k_i$ by means of relation (9)
2. Putting $c_k=0$ if $|k_i-k|<\nu$, if $\nu$ is fixed
3. Going back to (1) as long as there are non zero coefficients or as long as x% of the highest coefficients have not been used up (in the second case, the lowest "peaks" are thus eliminated).

It should be noted that the coefficients $c_k$ such that $|k-k_i|<\nu$ carry information that can be rammed up in a parameter. This parameter will be the center of mass $\mu_i$ associated with a fundamental frequency $F_{ki}$.

$$\mu_i = \frac{M_i}{E_i}$$

with $E_i = \sum_{k=k_i-\nu}^{k=k_i+\nu} c_k^2$ and $M_i = \sum_{k=k_i-\nu}^{k=k_i+\nu} kc_k^2$ For each interval, one can thus have a list $\{\mu_i, E_i\}$ for the most energetic frequencies. This data then comes into the intervals characterization.

1.4 Summary
1.4.1 Signal analysis
The segmentation method can thus include the following stages:

Defining the minimum size of an interval in the decomposition or the maximum number of levels (maxl) (knowing that $|I_j^0|=2^{N-maxl}$).

Preprocessing of the signal at each level (l=0, ... ,maxl)

$$S(t) \xrightarrow{\text{FOLDING}} \{S_0^m(t), \ldots, S_{21}^m(t)\}$$

by the folding operator.

Calculating the local spectrum at each level:

$$\{S_0^m(t), \ldots, S_{21}^m(t)\} \xrightarrow{\text{DCT-IV}} \{c_0^m(t), \ldots, c_{21}^m(t)\}$$

by using the DCT-IV.

Selection of the adapted local spectrum by entropy minimization, and "calculation" of the corresponding adapted temporal partition.

Realization of a definitive partition by comparing the intervals of the adapted temporal partition according to the criteria as follows:

the fundamental frequency (and the main frequencies), the centers of mass (or centers of frequency), the theoretical dimensions of the segments, autocorrelation, covariance . . .

A given behaviour can be characterized by particular values for these different parameters. Any segment can thus be known with precision.

This process thus allows segmentation of the signal into parts as homogeneous as possible, and each segment can be associated with an easily manipulable parameter vector.

1.4.2 Synthesis
The segmentation can be followed by the following stages:

Reconstruction of the preprocessed signal from the adapted temporal partition by using the DCT-IV Reconstruction of the original signal by means of the unfolding operator.

1.4.3 Compression
Reconstruction of the signal can be performed, for example, from 5% of the most energetic coefficients of each interval of the adapted temporal partition (see the fundamental frequencies search method for selecting the most energetic frequencies).

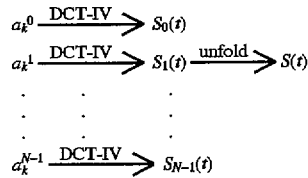

We claim:
1. A method for transmitting at least one signal associated with drilling conditions and/or the behavior of an element of a drill string including a drill bit driven into rotation, said signal being provided by at least one sensor located in said drill string, said method comprising:

temporally segmenting said signal by segmentation means;

decomposing each segment into Time-Scale or Time-Freqency wavelets by calculation means so as to obtain wavelet coefficients: and, transmitting at least part of said coefficients.

2. A method as claimed in claim 1, wherein said Time-Scale wavelets are Morlet wavelets, orthogonal, biorthogonal or dyadic.

3. A method as claimed in claim 1, wherein said Time-Frequency wavelets are Malvar wavelets.

4. A method as claimed in claim 1, wherein characteristic coefficients of each segment are selected.

5. A method as claimed in claim 4, wherein said characteristic coefficients are the local maxima of said wavelet coefficients.

6. A method as claimed in claim 4, wherein said characteristic coefficients are the most energetic coefficients of each segment.

7. A method as claimed in claim 1, wherein a stage of quantification of the coefficients to be transmitted is performed.

8. A method as claimed in claim 1, wherein the original signal is reconstructed at least partly from said coefficients.

9. A method as claimed in claim 1, wherein the segmentation, calculation and transmission means are located in the vicinity of the sensor and the transmission is achieved between said means and the ground surface.

10. A method as claimed in claim 9, wherein a binary coding of said coefficients is performed and transmission is achieved through pulsations in a fluid or by electromagnetic wave.

11. A system for transmitting at least one signal associated with drilling conditions and/or the behavior of an element of a drill string including a drill bit driven into rotation, said signal being provided by at least one sensor located in said drill string, comprising:

means for segmenting said signal;

calculation means for providing wavelet coefficients of each segment by decomposition into Time-Scale or Time-Frequency wavelets; and, means for transmitting at least part of said coefficients.

12. A system as claimed in claim 11, comprising means of binary coding of said coefficients, said segmentation, calculation, transmission and coding means being located in the vicinity of the sensor.

* * * * *